United States Patent [19]
Grinberg et al.

[11] Patent Number: 5,341,895
[45] Date of Patent: Aug. 30, 1994

[54] MOVABLE CONTROL CONSOLE

[75] Inventors: Eugene Y. Grinberg, Shippensburg; Charles E. Gullan, Chambersburg, both of Pa.

[73] Assignee: Ingersoll-Rand Company, Woodcliff Lake, N.J.

[21] Appl. No.: 32,887

[22] Filed: Mar. 18, 1993

[51] Int. Cl.⁵ .............................................. B60K 26/00
[52] U.S. Cl. ................................. 180/326; 180/89.13; 180/334; 296/72
[58] Field of Search ............ 180/326, 334, 315, 89.13; 296/72

[56] References Cited

U.S. PATENT DOCUMENTS

| | | | |
|---|---|---|---|
| 2,831,544 | 4/1958 | Dunn et al. | 180/326 |
| 3,088,537 | 5/1963 | Le Tourneau | 180/89.12 |
| 3,944,277 | 3/1976 | Cyphert et al. | 180/89.13 |

FOREIGN PATENT DOCUMENTS 2228905  9/1990  United Kingdom ................ 180/326

Primary Examiner—Eric Culbreth
Attorney, Agent, or Firm—John J. Selko

[57] ABSTRACT

A movable instrument console for an asphalt paving machine includes a hollow instrument body movable back and forth along support rails extending widthwise of the machine and a brake shoe locking mechanism for locking the instrument console in place, and for unlocking it for movement to either side of the paving machine.

17 Claims, 5 Drawing Sheets

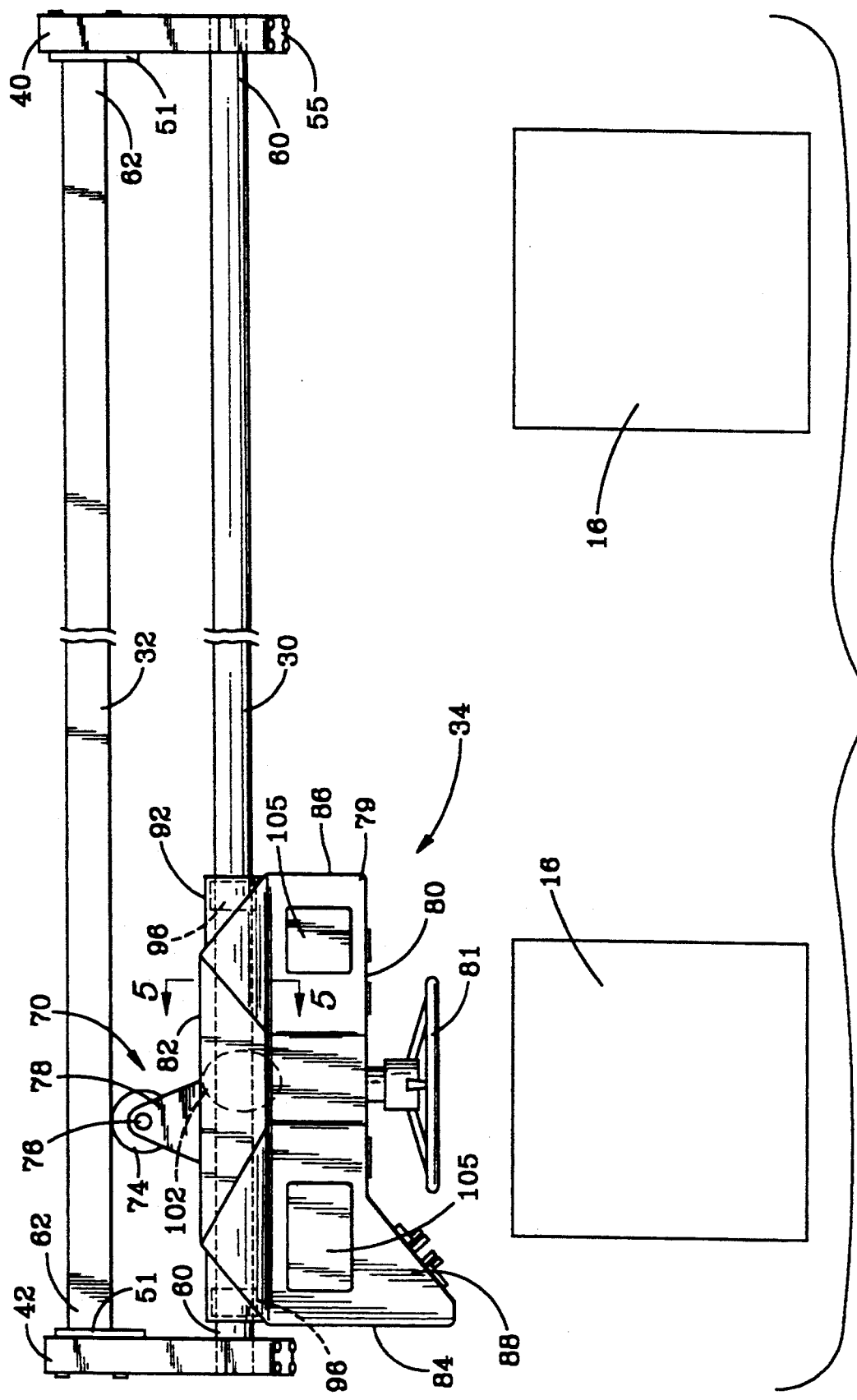

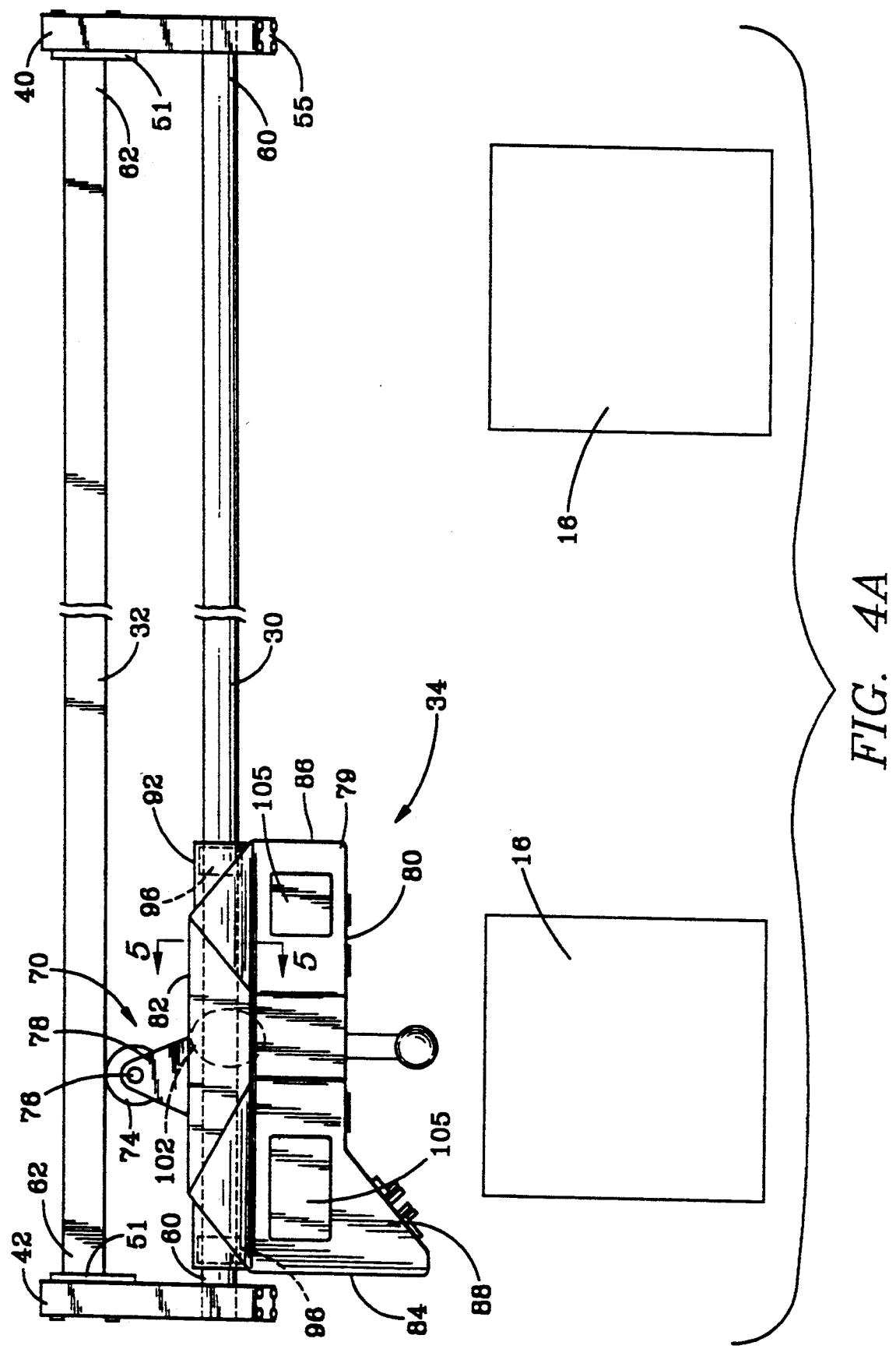

MOVABLE CONTROL CONSOLE

BACKGROUND OF THE INVENTION

This invention relates generally to mobile construction machines, and more particularly to instrument consoles for use on asphalt paving machines.

Instrument consoles for paving machines are required to be movable back and forth across the width of the machine, depending upon which side of the machine the operator needs to be positioned. Such instrument consoles are difficult to move and to lock in place and to unlock for movement.

The foregoing illustrates limitations known to exist in present instrument consoles. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a movable instrument console comprising a support rail for supporting the instrument console; means for connecting the support rail to the machine; the instrument console being movable back and forth along the support rail; a device for locking the instrument console in place and for unlocking the instrument console for movement; and means on the instrument console for receiving one end of control elements extending from the machine.

The foregoing and other aspects will become apparent from the following detailed description of the invention when considered in conjunction with the accompanying drawing figures.

BRIEF DESCRIPTION OF THE DRAWING FIGURES

FIG. 4 is a top view of the invention, along lines 4—4 of FIG. 2;

FIG. 4A is a view similar to FIG. 4, showing two seats for an operator and a joy stick for control.

DETAILED DESCRIPTION

Figure 1:
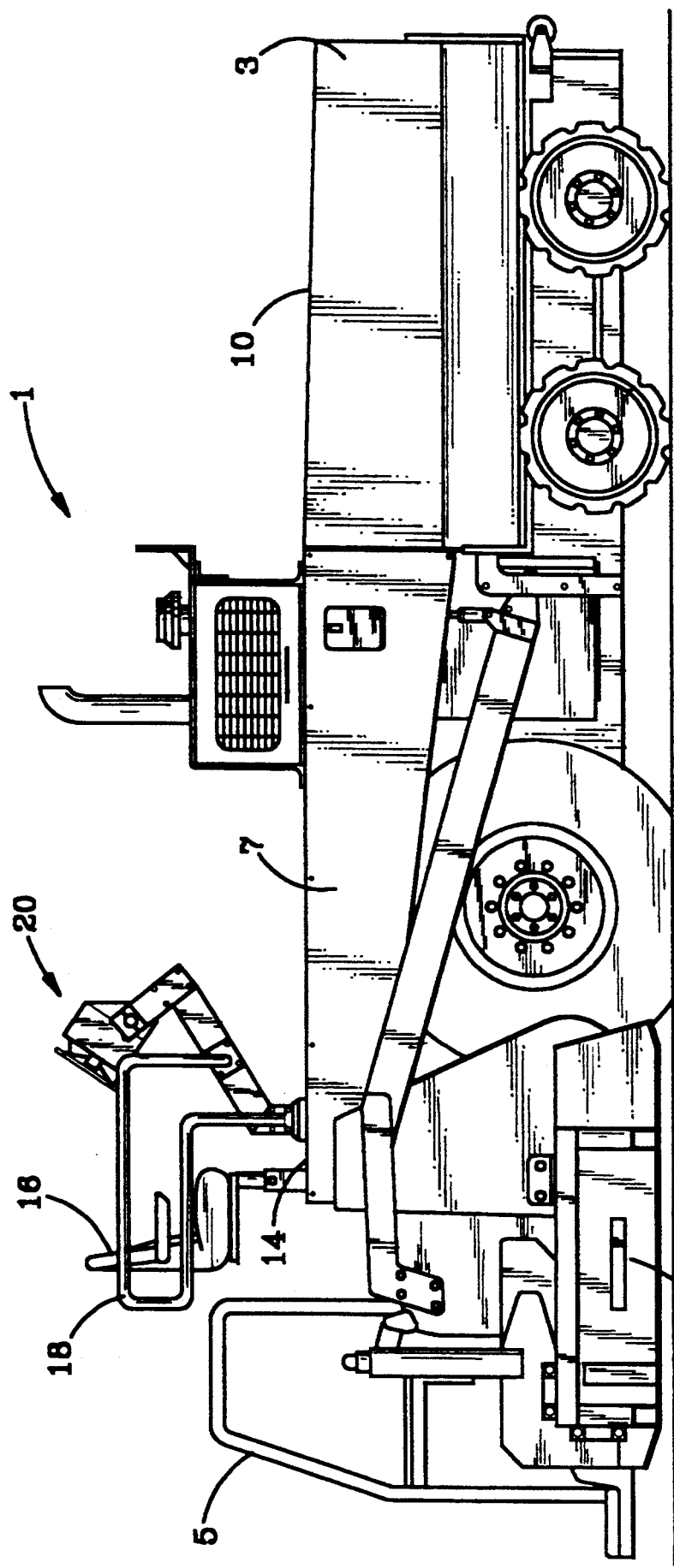
FIG. 1 is a side view of a paving machine with the invention thereon.

Now referring to the Figures, FIG. 1 shows a mobile asphalt paving machine 1, of conventional configuration, having a length extending between a front end 3, a back end 5 and width extending between a pair of side surfaces 7.

As is well known, a hopper 10 is positioned at front end 3 and a screed 12 is positioned at back end 5. An operator platform 14 is positioned intermediate hopper 10 and screed 12. Platform 14 extends widthwise of machine 1 so as to permit the operator to work at either side 7 of the machine that is required, depending upon the paving requirements. A seat 16 for the operator is positioned at each side 7 of the machine, as is a side rail 18. The movable instrument console of the invention is shown generally as 20, and is movable between either side 7 of the machine, as the operator requires.

Figure 2:
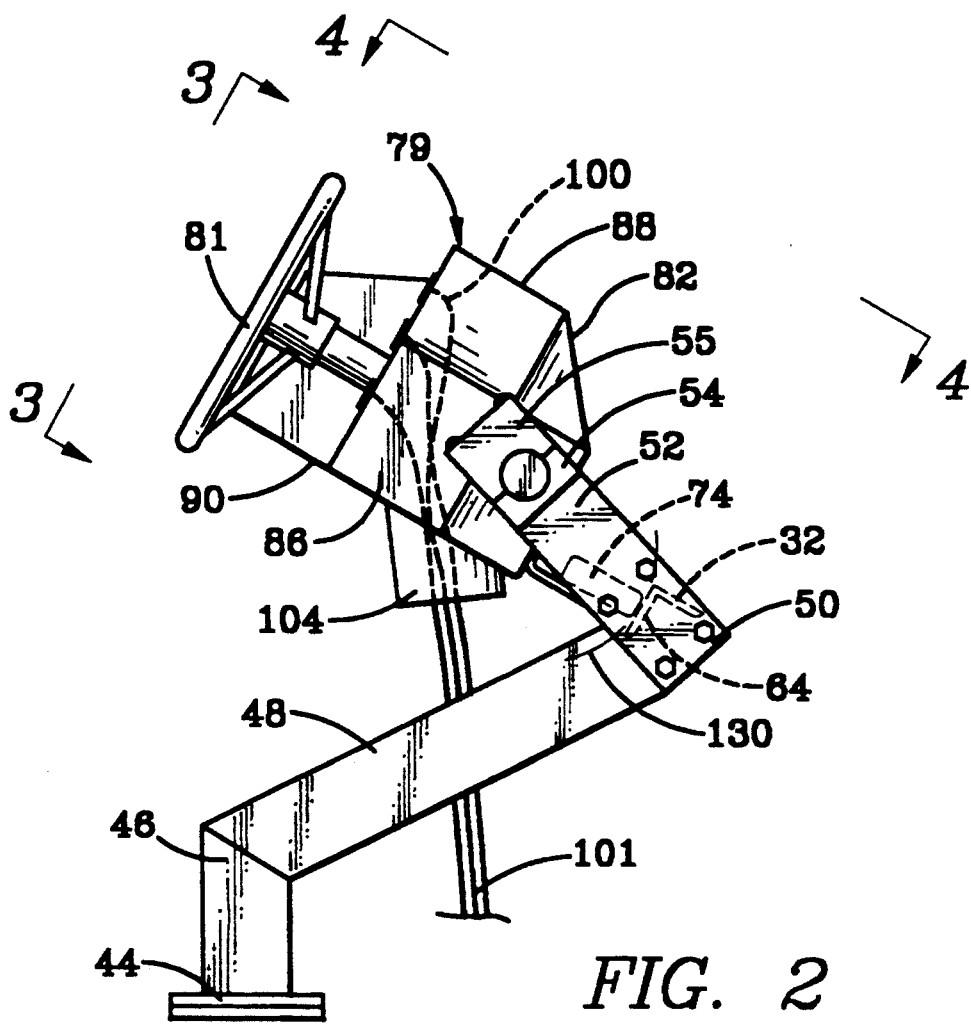
FIG. 2 is a magnified side view of the invention, with parts removed.
Figure 3:
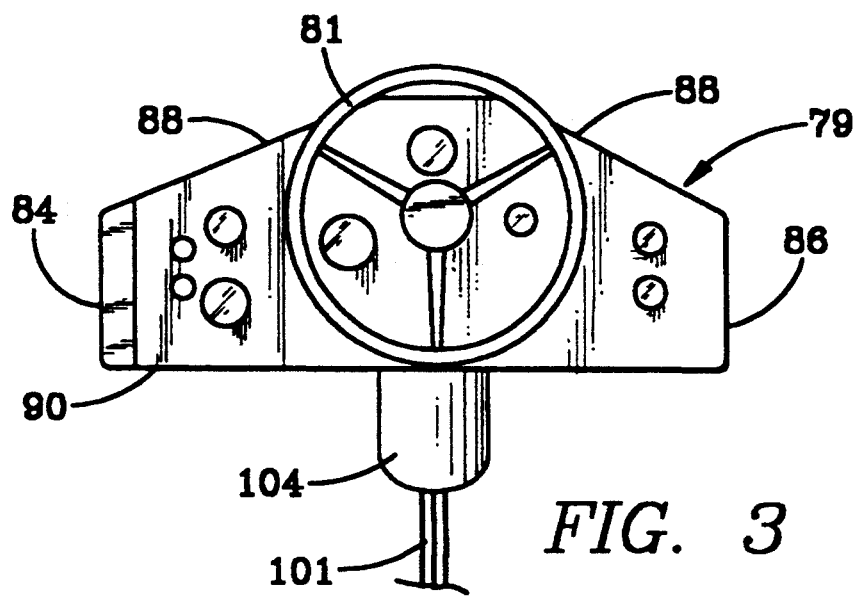
FIG. 3 is a front view of the instrument console, with parts removed, along lines 3—3 of FIG. 2.

Referring to FIGS. 2-4, the invention is shown to include a first support rail 30 extending widthwise of the machine 1. A second support rail 32 is parallel to first support rail 30 and is spaced therefrom. Instrument console 34 is movable back and forth along said support rails 30, 32, as described hereinafter. Support rails 30, 32 extend across the width of machine 1 and are support at each end by a first and second end support 40, 42. End supports 40, 42 are identical, and a description of one will be the same for both. End support 40 includes a base member 44 connected to platform 14, by bolts (not shown). Base member 44 extends vertically upwardly a short distance above platform 14 to a first end 46. An intermediate support member 48 is connected, as by welding, to first end 46. Intermediate support member 48 extends angularly upwardly from first end 46 and platform 14, in a direction that is disposed toward the front end 3 of the machine 1, and it ends in a first connection support end 50 for supporting a member described hereinafter.

Terminal support member 52 is connected, as by welding, to intermediate support member 48 at support end 50. Terminal support member 52 extends angularly upwardly from support end 50 and platform 14, in a direction that is the reverse of direction of intermediate support member 48, that is, it is disposed toward back end 5 of machine 1. Terminal support member 52 ends in a second connection support end 54, for supporting a member as described hereinafter.

As seen in FIG. 4, instrument console 34 is supported on a first support rail 30, that extends crosswise of machine 1 between end supports 40, 42. Each end 60 of first support rail 30 is supported at a second connection support end 54 of terminal support member 52. Console 34 is slidably movable along first support rail 30, across the width of machine 1. First support rail 30 is a solid tubular bar that is chrome plated and ground to a very smooth surface to facilitate the sliding movement of console 34. Rail 30 is connected to end 54 by means of a clamp 55 of conventional design.

Second support rail 32 extends parallel to first support rail 30 and is spaced therebelow. Each end 62 of second support rail 32 is supported at a first support connection support end 50 of intermediate support member 48. Second support rail 32 is an angle beam with one flange 64 positioned to provide a flat surface for a contact support device 70 to track along (FIG. 4). Rail 32 has a bracket 51 welded to each end 62, and bracket 51 is bolted to support end 50.

Contact support device 70 is attached to console 34 and includes a rotatable wheel, or caster 74, which rolls along flange 64 to provide support to console 34 in addition to the support provided by first support rail 30. Caster 74 is rotatable about a pivot axis 76 that is journaled between a pair of spaced-apart ears 78 connected to console 34, as by bolting. The tilt angle of console 34 about support rail 30 can be varied by placing a spacer (not shown) between support device 70 and console 34 rear panel (identified below as rear panel 82).

As seen in FIGS. 2-4, console 34 is a hollow body member 79 having a front panel 80, a rear panel 82, a first side panel 84, a second side panel 86, a top panel 88 and a bottom panel 90. An elongated hollow tubular housing 92 extends through the body member 79 between side panels 84, 86 and is connected to the body member 79, as by welding. Housing 92 is concentrically telescoped on first support rail 30 for sliding therealong. Removably fit into each end of housing 92 is a bushing 96 made of a suitable plastic material that has a low coefficient of friction. We prefer a nylon material. Bushing 96 is held in place by any conventional device such as a snap ring, set screws or steaking (not shown). Thus, it can be understood that body member 79 is slidable along support rail 30 and 32, widthwise of the machine 1.

Front panel 80 is adapted to carry and display any variety of indicator devices for indicating to the machine operator control information about the machine 1, and for actuating control features of the machine 1. We prefer to form front panel 80 into two segments, each segment angularly disposed to each other, so that the two segments and devices thereon face a generally central position in front of front panel 80, where the operator will usually be positioned. This angular configuration improves the operator's ability to see and reach all the devices on the front panel 80. Typically, such devices include meters, electrical and hydraulic controls, switches and valves. A steering wheel 81 is shown, but a joystick is also acceptable.

Such indicator devices are connected to one end of plurality of individual control elements 100 that extend from the machine 1, as is well known. Elements 100 are flexible and are gathered together into a flexible harness 101 that is inserted into body member 79 by way of an aperture 102 in bottom panel 90. An optional tube member 104 can be welded to bottom panel 90 around aperture 102 for protection of the harness 101, which extends therethrough. Access doors 105 of conventional design are located in top panel 88 for access to the connection of control elements 100 and body 79, for repair purposes.

Figure 5:
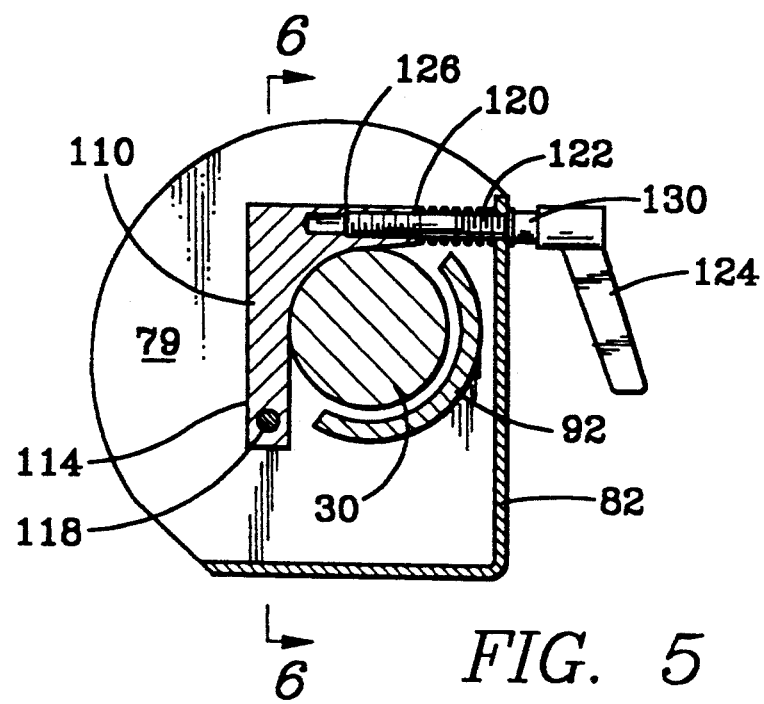
FIG. 5 is a cross section along lines 5—5 of FIG. 4.
Figure 6:
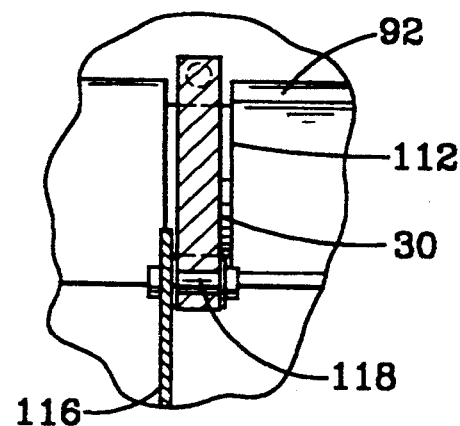
FIG. 6 is a cross section along lines 6—6 of FIG. 5.

Referring to FIGS. 5-6, the brake means for locking console 34 in place will be described. Brake shoe 110 is positioned in body 79 and spaced from housing 92, adjacent an aperture 112 in housing 92 that exposes first support rail 30 therein. First end 114 of brake shoe 110 is pivotally connected to body 79 by a bracket 116 and pivot pin 118, for pivoting about pivot pin 118. Second end 120 of brake shoe is connected to a shaft 122 that extends outwardly through rear panel 82 to a pistol grip handle 124 connected thereto. Inner end 126 of shaft 122 is threaded into matching threads in second end 120 of brake shoe 110, whereby turning of pistol grip handle 124 draws brake shoe 110 into aperture 112 to fictionally contact support rail 30, for locking body 79 in place. When handle 124 is turned in a locking direction, bushing 130 on shaft 122 fictionally engages rear panel 82 for retaining brake shoe 110 in place against rail 30. A reverse turning of handle 124 releases brake shoe 110, to permit body 79 to be moved on rail 30 by the operator. Other types of braking mechanisms would be acceptable.

As shown in FIG. 2, body 79 is pivotable about rail 30 so that contact support device 70 can be pivoted along arc 130 out of contact with flange 64, when the operator chooses to stand and wants the front panel 80 to face upwardly. Brake shoe 110 will also move along with body 79.

While we have disclosed this invention for use with an asphalt paving machine it can be used on other types of mobile construction equipment which require an operator to operate the equipment from either side thereof.

Having described the invention, what is claimed is:

1. A movable instrument console for a mobile construction machine, the machine having a length extending between a front end and a back end and a width extending between a pair of side surfaces, comprising:
   a. support rail means for supporting an instrument console thereon;
   b. means for connecting said support rail means to the machine, adjacent one end of the machine;
   c. said support rail means being positioned to extend widthwise of the machine and spaced above a machine operator's platform;
   d. said instrument console being movable side-to-side along said support rail means between either side of the machine;
   e. said instrument console being pivotable about said support rail means to position a front panel on said console to face upwardly;
   f. locking means for locking said instrument console in place and for unlocking said instrument console for movement; and
   g. means on said instrument console for receiving one end of flexible control elements from the machine.

2. A movable instrument console for a mobile construction machine, the machine having a front-to-back length and a side-to-side width comprising:
   a. a first support rail extending widthwise of the machine;
   b. a second support rail parallel to said first support rail, and spaced therefrom;
   c. said first and second support rails being spaced above a machine operator's platform adjacent one end of the machine;
   d. an instrument console movable side-to-side along said first and second support rails;
   e. said instrument console being pivotable about said first support rail to position a front panel on said console to face upwardly;
   f. locking means for locking said console in place and for unlocking said console for movement; and
   g. means on said console for receiving one end of flexible control elements from the machine.

3. The instrument console of claim 2 further comprising:
   a. said instrument console being mounted on, and movable along said first support rail means; and
   b. contact support means on said instrument console in movable contact with said second support rail, for supporting said instrument console during movement thereof.

4. The instrument console of claim 3 further comprising:
   a. steering means on said instrument console for connection to steering control elements of the machine; and
   b. instrument panel means on said instrument console for carrying and displaying for an operator a plurality of indicator devices for control of the machine.

5. The instrument console of claim 4 further comprising:
   a. said instrument console being pivotable about said first support rail, whereby said instrument console can be tilted up and down.

6. The instrument console of claim 5 further comprising:
   a. said first support rail being spaced above said second support rail;

b. said second support rail being spaced closer to one end of the machine than said first support rail.

7. The instrument console of claim 6 wherein said first support rail is a tubular member, and said instrument console is telescopically slidable along said tubular member.

8. The instrument console of claim 7 further comprising:
   a. a hollow body member having a front panel, a rear panel, a pair of side panels therebetween, a top panel and a bottom panel;
   b. an elongated tubular housing extending between said side panels, said housing concentrically mounted on said tubular member; and
   c. bushing means in said housing for movably contacting said tubular member to permit said instrument console to move along said tubular member.

9. The instrument console of claim 8 wherein said locking means comprises:
   a. brake shoe means in said body, spaced from said first support rail for locking and unlocking said instrument console for movement thereof; and
   b. means for moving said brake shoe into contact against said first support rail to lock said instrument console in place, and for moving said brake shoe out of contact from said first support rail to unlock said instrument console for movement thereof.

10. The instrument console of claim 9 wherein said brake shoe means further comprises:
    a. an aperture in said housing exposing a portion of said first support rail therein;
    b. means for pivotally mounting a first end of an elongated brake shoe assembly adjacent said aperture in said housing;
    c. handle means connected to a second end of said elongated brake shoe assembly, extending out of said body, for moving said brake shoe assembly into and out of contact with said first support rail; and
    d. means in combination with said handle means for locking said brake shoe assembly in position by frictionally engaging said handle and rear panel on said console.

11. The instrument console of claim 10 in combination with a first machine operator seat, spaced from said instrument console, and positioned adjacent a first side of the machine on the machine operator's platform; and a second machine operator seat, spaced from said instrument console, and positioned adjacent a second side of the machine on the machine operator's platform.

12. The instrument console of claim 11 wherein said second support rail is an angle beam and said contact support means is a rotatable caster in rolling contact against said beam.

13. The instrument console of claim 12 wherein said steering means is a steering wheel.

14. The instrument console of claim 13 wherein said steering means is a joy stick.

15. The instrument console of claim 6 wherein said first support rail and said second support rail extend between a first end support adjacent a first side of the machine and a second end support adjacent a second side of the machine.

16. The instrument console of claim 15 wherein said first and second end support are parallel to each other and each comprises:
    a. a base member connected to said machine operator's platform, extending vertically upwardly therefrom to a first end;
    b. an intermediate support member connected to said first end and extending angularly upwardly therefrom, in a direction disposed toward one end of the machine, to a first connection support end, said first connection support end supporting one end of said second support rail; and
    c. a terminal support member connected to said intermediate support member at said first connection support end and extending angularly upwardly therefrom, in a direction disposed toward a second end of the machine, to a second connection support end, said second connection support end supporting one end of said first support rail.

17. The instrument console of claim 8 wherein said hollow body is adapted for connection therein with one end of flexible control elements from the machine, and said body has a plurality of doors therein for access by a machine operator to the interior of said hollow body for repairs.

* * * * *